United States Patent
Roh et al.

(10) Patent No.: US 12,325,637 B2
(45) Date of Patent: Jun. 10, 2025

(54) MAX AND MXENE USING VANADIUM CARBIDE AND METHOD FOR MANUFACTURING SAME

(71) Applicant: Korea Institute Of Geoscience And Mineral Resources, Daejeon (KR)

(72) Inventors: Ki-Min Roh, Daejeon (KR); Han-Jung Kwon, Jeonju-si (KR); Sun-Kyung Kim, Daejeon (KR); Tae-Jun Park, Daejeon (KR)

(73) Assignee: KOREA INSTITUTE OF GEOSCIENCE AND MINERAL RESOURCES, Daejeon (KR)

( * ) Notice: Subject to any disclaimer, the term of this patent is extended or adjusted under 35 U.S.C. 154(b) by 0 days.

(21) Appl. No.: 18/764,503

(22) Filed: Jul. 5, 2024

(65) Prior Publication Data
US 2025/0145473 A1      May 8, 2025

(30) Foreign Application Priority Data
Nov. 6, 2023   (KR) .................. 10-2023-0152100

(51) Int. Cl.
*C01B 32/914*   (2017.01)
*B82Y 40/00*    (2011.01)

(52) U.S. Cl.
CPC ............ *C01B 32/914* (2017.08); *B82Y 40/00* (2013.01); *C01P 2002/72* (2013.01); *C01P 2006/80* (2013.01)

(58) Field of Classification Search
CPC ............... C01B 32/914; B82Y 40/00; C01P 2002/72; C01P 2006/80
See application file for complete search history.

(56) References Cited

U.S. PATENT DOCUMENTS

| | | |
|---|---|---|
| 10,683,208 B2 | 6/2020 | Shin et al. |
| 2017/0088429 A1 | 3/2017 | Shin et al. |
| 2018/0309125 A1 * | 10/2018 | Beidaghi ............. H01M 10/054 |

FOREIGN PATENT DOCUMENTS

| | | |
|---|---|---|
| KR | 10-2017-0036507 A | 4/2017 |
| KR | 10-2023-0136398 A | 9/2023 |

OTHER PUBLICATIONS

Wang et al. "Synthesis and oxidation resistance of V2AlC powders by molten salt method" Int' J. Appl. Ceram. Technol. 2017;14: 873-879. (Year: 2017).*

J.E. von Treifeldt, K.L. Firestein, J.F.S. Fernando, et al., The effect of Ti3AlC2 MAX phase synthetic history on the structure and electrochemical properties of resultant Ti3C2 MXenes, Materials & Design (2020),.

Ravuri Syamsai, Andrews Nirmala Grace, "Synthesis, Properties and Performance Evaluation of Vanadium Carbide MXene as Supercapacitor Electrodes", Ceramics International (2019).

* cited by examiner

*Primary Examiner* — Wayne A Langel
*Assistant Examiner* — Syed T Iqbal
(74) *Attorney, Agent, or Firm* — Harness, Dickey & Pierce, P.L.C.

(57) ABSTRACT

The present disclosure provides Max and MXene using low-cost vanadium carbide instead of an expensive vanadium metal, and a method for preparing same.

13 Claims, 5 Drawing Sheets

(1) REFINING AND MIXING RAW MATERIALS

(2) PREPARATION OF VANADIUM CARBIDE

MAX AND MXENE USING VANADIUM CARBIDE AND METHOD FOR MANUFACTURING SAME

CROSS-REFERENCE TO RELATED APPLICATIONS

This application claims the priority of Korean Patent Application No. 10-2023-0152100 filed on Nov. 6, 2023, in the Korean Intellectual Property Office, the disclosure of which is incorporated herein by reference.

TECHNICAL FIELD

The present disclosure relates to Max and MXene using low-cost vanadium carbide instead of an expensive vanadium metal and a method for preparing same.

BACKGROUND ART

Generally, a process of preparing vanadium-based Max powder comprises reacting a vanadium metal with aluminum and carbon to prepare vanadium-based Max powder. Since the vanadium metal is expensive, preparing vanadium-based Max powder requires a lot of cost, making it difficult to apply in industry.

In addition, the vanadium metal is a material that easily forms carbides, nitrides, or oxides due to its high affinity with non-metallic components such as carbon, nitrogen, and oxygen.

Accordingly, through a long period of hard work and various researches, the applicant of the present disclosure obtained Max and MXene using low-cost vanadium carbide instead of an expensive vanadium metal, and a method for preparing same, and has completed the present disclosure.

PRIOR ART CITATIONS

Patent Citations

Korean Laid-open Patent Publication No. 2017-0036507 (Publication Date: Apr. 3, 2017)

CONTENTS OF THE INVENTION

Technical Problems

Therefore, an objective of the present disclosure is to provide Max using low-cost vanadium carbide instead of an expensive vanadium metal.

In addition, an objective of the present disclosure is to provide MXene using low-cost vanadium carbide instead of an expensive vanadium metal.

In addition, an objective of the present disclosure is to provide a method for preparing Max using low-cost vanadium carbide instead of an expensive vanadium metal.

In addition, an objective of the present disclosure is to provide a method for preparing MXene using low-cost vanadium carbide instead of an expensive vanadium metal.

The objectives of the present disclosure are not limited to the objects described above and other objectives will be clearly understood by those skilled in the art from the following description.

Means of Solving Problem

In order to achieve the above-described objectives, according to one aspect of the present disclosure, there is provided Max using low-cost vanadium carbide, wherein the Max consists of vanadium carbide of vanadium, aluminum, and carbon, and is used as a raw material for MXene, which is a two-dimensional nanomaterial, and is at least one selected from compounds represented by the following formulae 1 to 3:

$$V_2AlC \quad [\text{Formula 1}]$$

$$V_4AlC_3 \quad [\text{Formula 2}]$$

$$V_{12}Al_3C_8. \quad [\text{Formula 3}]$$

According to one embodiment of the present disclosure, the Max using vanadium carbide may be formed by subjecting a mixture of vanadium carbide and aluminum to heat-treatment under an inert gas.

According to one embodiment of the present disclosure, the vanadium carbide may be formed by refining vanadium oxide and a carbon compound, followed by mixing, to prepare a mixture of the vanadium oxide and the carbon compound, and subjecting the mixture to heat-treatment under vacuum and normal pressure.

According to one embodiment of the present disclosure, the vanadium carbide may have a molar ratio of vanadium to carbon of 2:1, 3:2, or 4:3.

According to one embodiment of the present disclosure, the Max using vanadium carbide may exclude the use of a vanadium metal.

According to one embodiment of the present disclosure, the carbon content in the Max using vanadium carbide may be 8 to 14 wt %.

According to one embodiment of the present disclosure, the oxygen content in the Max using vanadium carbide may be 1,000 to 5,000 ppm.

In addition, according to another aspect of the present disclosure, there is provided MXene using vanadium carbide, which is a two-dimensional nanomaterial formed by subjecting the Max using vanadium carbide to aluminum etching and interlayer peeling.

According to one embodiment of the present disclosure, the MXene using vanadium carbide may be at least one selected from compounds represented by the following formulae 4 to 6:

$$V_2C \quad [\text{Formula 4}]$$

$$V_4C_3 \quad [\text{Formula 5}]$$

$$V_3C_2. \quad [\text{Formula 6}]$$

According to one embodiment of the present disclosure, the carbon content in the MXene using vanadium carbide may be 10.5 to 15 wt %.

In addition, according to another aspect of the present disclosure, there is provided a method for preparing Max, comprising (a-1) mixing vanadium oxide and a carbon compound to form a mixed powder and refining the particle size through high-energy milling using a high-energy milling device, followed by carbonation-reduction reaction by vacuum heat-treatment, to prepare vanadium carbide; and (a-2) adding aluminum to the vanadium carbide, followed by heat-treatment under an inert gas, to prepare Max using vanadium carbide.

According to one embodiment of the present disclosure, the particle size of the mixed powder of the vanadium oxide and the carbon compound may be 2 nm to 50 μm.

According to one embodiment of the present disclosure, the high-energy milling may be performed by mixing the vanadium oxide and the carbon compound, putting the mixed powder together with a steel ball into a rotating container in a high-energy milling device, subjecting the mixture to a carbonation-reduction reaction in an atmosphere of air, vacuum, nitrogen, or argon, and refining the vanadium oxide and carbon compound through high-energy milling, to increase the contact area and carbonation-reduction reaction rate.

In addition, according to another aspect of the present disclosure, there is provided a method for preparing MXene, comprising (b-1) mixing vanadium oxide and a carbon compound to form a mixed powder and refining the particle size through high-energy milling using a high-energy milling device, followed by carbonation-reduction reaction by vacuum heat-treatment, to prepare vanadium carbide; (b-2) adding aluminum to the vanadium carbide, followed by heat-treatment under an inert gas, to prepare Max using vanadium carbide; and (b-3) subjecting the Max using vanadium carbide to aluminum etching and interlayer peeling, to prepare MXene using vanadium carbide.

According to one embodiment of the present disclosure, in the step of (b-1) mixing vanadium oxide and a carbon compound to form a mixed powder and refining the particle size through high-energy milling using a high-energy milling device, followed by carbonation-reduction reaction by vacuum heat-treatment, to prepare vanadium carbide, the mixing ratio of the vanadium oxide and the carbon compound may be 1:0.3 to 1:0.5 in weight ratio.

According to one embodiment of the present disclosure, in the step of (b-1) mixing vanadium oxide and a carbon compound to form a mixed powder and refining the particle size through high-energy milling using a high-energy milling device, followed by carbonation-reduction reaction by vacuum heat-treatment, to prepare vanadium carbide, the steel ball of the high-energy milling device may be at least one selected from ceramic balls, metal balls, and cemented carbide balls.

According to one embodiment of the present disclosure, in the step of (b-1) mixing vanadium oxide and a carbon compound to form a mixed powder and refining the particle size through high-energy milling using a high-energy milling device, followed by carbonation-reduction reaction by vacuum heat-treatment, to prepare vanadium carbide, the heat-treatment temperature of the vacuum heat-treatment may be 1200° C. to 1600° C., and the heat-treatment time may be 1 hour to 5 hours.

According to one embodiment of the present disclosure, in the step of (b-1) mixing vanadium oxide and a carbon compound to form a mixed powder and refining the particle size through high-energy milling using a high-energy milling device, followed by carbonation-reduction reaction by vacuum heat-treatment, to prepare vanadium carbide, the rotating shaft of the high-energy milling device may rotate at 150 to 250 rpm, and the rotating container may rotate at 300 to 500 rpm in a direction opposite to the rotation direction of the rotating shaft, to perform high-energy milling for 1 to 20 hours.

According to one embodiment of the present disclosure, in the step of (b-2) adding aluminum to the vanadium carbide, followed by heat-treatment under an inert gas, to prepare Max using vanadium carbide, the heat-treatment temperature may be 1200° C. to 1600° C., and the heat-treatment time may be 1 hour to 5 hours.

According to one embodiment of the present disclosure, the high-energy milling device may be a planetary ball mill, spex mill, or attritor.

According to one embodiment of the present disclosure, in the step of (b-3) subjecting the Max using vanadium carbide to aluminum etching and interlayer peeling, to prepare MXene using vanadium carbide, the aluminum etching may be performed using at least one selected from hydrofluoric acid (HF), lithium fluoride (LiF), sodium fluoride (NaF), magnesium fluoride ($MgF_2$), or a combination thereof, or a combination of these with at least one of hydrochloric acid, sulfuric acid and nitric acid.

Effect of the Invention

According to the present disclosure, the present disclosure provides Max using low-cost vanadium carbide instead of an expensive vanadium metal, which has a low oxygen content, a small particle size, and excellent physical properties and can be used for a variety of purposes, e.g., in Max precursors, cemented carbide raw materials, catalysts, and semiconductor materials.

In addition, the present disclosure provides MXene using low-cost vanadium carbide instead of an expensive vanadium metal, which, as a two-dimensional nanomaterial, has excellent physical properties and can be used for a variety of purposes, e.g., in semiconductor materials, electronic materials, and catalysts.

In addition, the present disclosure provides a method for preparing Max using low-cost vanadium carbide instead of an expensive vanadium metal, which has excellent process stability and is economical as it enables mass production.

In addition, the present disclosure provides a method for preparing MXene using low-cost vanadium carbide instead of an expensive vanadium metal, which has excellent process stability and is economical as it enables mass production.

The effects of the present disclosure are not limited thereto and it should be understood that the effects include all effects that can be inferred from the configuration of the present disclosure described in the following specification or claims.

DETAILED DESCRIPTION OF THE EMBODIMENTS

Hereinafter, preferred embodiments of the present disclosure will be described with reference to accompanying drawings.

The advantages and features of the present disclosure, and methods of achieving them will be clear by referring to the exemplary embodiments that will be described hereafter in detail with reference to the accompanying drawings.

However, the present disclosure is not limited to the exemplary embodiments described hereafter and may be implemented in various ways, and the exemplary embodiments are provided to complete the description of the present disclosure and let those skilled in the art completely know the scope of the present disclosure and the present disclosure is defined by claims.

Further, when it is determined that well-known technologies, etc. may make the scope of the present disclosure unclear, they will not be described in detail in the following description.

Hereinafter, the present disclosure is described in detail.

Max Using Vanadium Carbide

The present disclosure provides Max using low-cost vanadium carbide instead of an expensive vanadium metal.

The Max using vanadium carbide of the present disclosure may consist of vanadium carbide of vanadium, aluminum, and carbon, may be used as a raw material for MXene, which is a two-dimensional nanomaterial, and may be at least one selected from compounds represented by the following formulae 1 to 3:

$$V_2AlC \quad \text{[Formula 1]}$$

$$V_4AlC_3 \quad \text{[Formula 2]}$$

$$V_{12}Al_3C_8. \quad \text{[Formula 3]}$$

The present disclosure provides Max using low-cost vanadium carbide instead of an expensive vanadium metal, which has a low oxygen content, a small particle size, and excellent physical properties, and can be used for a variety of purposes, e.g., in Max precursors, cemented carbide raw materials, catalysts, and semiconductor materials.

Generally, a process of preparing vanadium-based Max powder comprises reacting a vanadium metal with aluminum and carbon to prepare vanadium-based Max powder. Since the vanadium metal is expensive, preparing vanadium-based Max powder requires a lot of cost, making it difficult to apply in industry.

In addition, the vanadium metal is a material that easily forms carbides, nitrides, or oxides due to its high affinity with non-metallic components such as carbon, nitrogen, and oxygen.

Accordingly, through a long period of hard work and various researches, the applicant of the present disclosure obtained Max and MXene using low-cost vanadium carbide instead of an expensive vanadium metal, and a method for preparing same, and has completed the present disclosure.

Here, the present disclosure may be Max using low-cost vanadium carbide instead of an expensive vanadium metal.

At this time, the vanadium metal is a material that easily forms carbides, nitrides, or oxides due to its high affinity with non-metallic components such as carbon, nitrogen, and oxygen.

The vanadium carbide of the present disclosure may be formed by mixing vanadium oxide and a carbon compound, refining the particle size through high-energy milling using a high-energy milling device, followed by carbonation-reduction reaction by vacuum heat-treatment.

That is, Max using the vanadium carbide may be formed by subjecting a mixture of vanadium carbide and aluminum to heat-treatment under an inert gas.

At this time, the vanadium carbide may be formed by refining vanadium oxide and a carbon compound, followed by mixing, to prepare a mixture of the vanadium oxide and the carbon compound, and subjecting the mixture to heat-treatment under vacuum and normal pressure.

In addition, the vanadium carbide may have a molar ratio of vanadium to carbon of 2:1, 3:2, or 4:3.

Here, when the molar ratio of vanadium and carbon is the above-described ratio, the vanadium carbide may have excellent physical properties, and the prepared Max may have excellent physical properties.

In particular, since the oxygen content in the Max is low, the Max may have excellent semiconductor properties.

At this time, the oxygen content may be 1,000 to 5,000 ppm.

Here, when the oxygen content is within the above-described range, oxycarbide in the form of $V(C_xO_{1-x})$ with a large amount of oxygen may not be easily formed.

At this time, the oxygen content may preferably be 1,000 to 4,980 ppm, and more preferably 1,000 ppm to 4,950 ppm.

In addition, the carbon content in the Max using vanadium carbide may be 8 to 14 wt %.

Here, when the carbon content in the Max using vanadium carbide is within the above-described range, the Max using vanadium carbide may not be easily formed into Max with a large amount of oxygen.

At this time, the carbon content in the Max using vanadium carbide may preferably be 8.2 to 13.8 wt %, and more preferably 8.5 to 13.5 wt %.

In addition, the particle size of the mixed powder of the vanadium oxide and the carbon compound may be 2 nm to 50 μm.

Here, when the particle size of the mixed powder of the vanadium oxide and the carbon compound is within the above-described range, the contact area between the vanadium oxide and the carbon compound may increase, to increase the carbonation-reduction reaction rate.

At this time, the particle size of the mixed powder of the vanadium oxide and the carbon compound may preferably be 2 nm to 48 μm, and more preferably 2 nm to 45 μm.

In addition, the Max using vanadium carbide may be $V_2AlC$, $V_{12}Al_3C_8$, or $V_4AlC_3$.

Here, the $V_2AlC$ may be expressed by the following Scheme 1:

$$2VC_{0.5} + Al \rightarrow V_2AlC. \quad \text{[Scheme 1]}$$

In addition, the $V_{12}Al_3C_8$ may be represented by the following Scheme 2:

$$12VC_{0.67} + 3Al \rightarrow V_{12}Al_3C_8. \quad \text{[Scheme 2]}$$

In addition, the $V_4AlC_3$ may be represented by the following Scheme 3:

$$4VC_{0.75} + Al \rightarrow V_4AlC_3. \quad \text{[Scheme 3]}$$

Here, the Max using vanadium carbide may exclude the use of a vanadium metal.

For example, if vanadium carbide with a molar ratio of vanadium to carbon of 2:1, 3:2, or 4:3 is used as a raw material, a vanadium metal may be excluded in the process of preparing vanadium-based Max powder.

In addition, the vanadium oxide may be at least one selected from vanadium pentoxide ($V_2O_5$), sodium metavanadate ($NaVO_3$), vanadium trioxide ($V_2VO_3$), vanadium oxychloride ($VOCl_3$), and ammonium metavanadate ($H_4NVO_3$).

In addition, the carbon compound may be at least one selected from industrial carbon powder, coke, coal, coal tar, activated carbon, graphite, natural graphite, artificial graphite, carbon black, acetylene black, Ketjen black, channel black, furnace black, lamp black, summer black, industrial diamond, and carbon fiber.

Here, the carbon compound may further comprise a biomass, which is at least one selected from coffee grounds, fallen leaves, and waste wood.

In addition, the carbon compound may further comprise a reducing gas containing carbon, which is at least one selected from carbon monoxide, methane, and hydrocarbons.

In addition, the high-energy milling may be performed by mixing the vanadium oxide and a carbon compound, putting the mixed powder together with a steel ball into a rotating container in a high-energy milling device, injecting high energy of 0.6 to 2.4 J/g·s in an atmosphere of air, vacuum, nitrogen, or argon, rotating the rotating shaft at 150 to 250 rpm, rotating the rotating container at 300 to 500 rpm in a direction opposite to the rotation direction of the rotating shaft, to perform high-energy milling for 1 to 20 hours.

In addition, the high-energy milling device may be a planetary ball mill, spex mill, or attritor.

Here, the planetary ball mill may charge a steel ball together with a raw material into a container and rotate and revolve the container at a high speed, thereby reducing the particle size of the mixed powder of the vanadium oxide and the carbon compound to the above-described range.

In addition, the spex mill may charge a steel ball together with a raw material into a container and vibrate the container up and down and left and right at a high speed, thereby reducing the particle size of the mixed powder of the vanadium oxide and the carbon compound to the above-described range.

In addition, the attritor may charge a steel ball together with a raw material into a container and transfer energy by the rotational force of the rotor, thereby reducing the particle size of the mixed powder of the vanadium oxide and the carbon compound to the above-described range.

In addition, the high-energy milling device may rotate the rotating container containing the mixed powder of the vanadium oxide and the carbon compound and the rotating shaft of the rotating plate in opposite directions on the rotating plate, thereby reducing the particle size of the mixed powder of the vanadium oxide and the carbon compound to the above-described range.

In addition, the heat-treatment temperature of the vacuum heat-treatment may be 1200° C. to 1600° C., and the heat-treatment time may be 1 hour to 5 hours.

Here, when the heat-treatment temperature of the vacuum heat-treatment is within the above-described range, the vanadium carbide may have excellent low-oxygen properties and manufacturing efficiency.

That is, the mixed powder of the vanadium oxide and the carbon compound prepared by the high-energy milling device may be subjected to vacuum heat-treatment at the heat-treatment temperature of the vacuum heat-treatment to prepare vanadium carbide with excellent low-oxygen properties and manufacturing efficiency.

At this time, the heat-treatment temperature of the vacuum heat-treatment may be preferably 1300° C. to 1550° C., and more preferably 1400° C. to 1500° C.

In addition, when the heat-treatment time of the vacuum heat-treatment is within the above-described range, the vanadium carbide may have excellent low-oxygen properties and manufacturing efficiency.

That is, the mixed powder of the vanadium oxide and the carbon compound prepared by the high-energy milling device may be subjected to vacuum heat-treatment during the heat-treatment time of the vacuum heat-treatment to prepare vanadium carbide with excellent low-oxygen properties and manufacturing efficiency.

At this time, the heat-treatment time of the vacuum heat-treatment may preferably be 2 hours to 4 hours, and more preferably 2 hours to 3 hours.

In addition, the carbonation-reduction reaction may be performed by refining the vanadium oxide and carbon compound by the high-energy milling to increase the contact area and carbonation reduction reaction rate.

Figure 1:
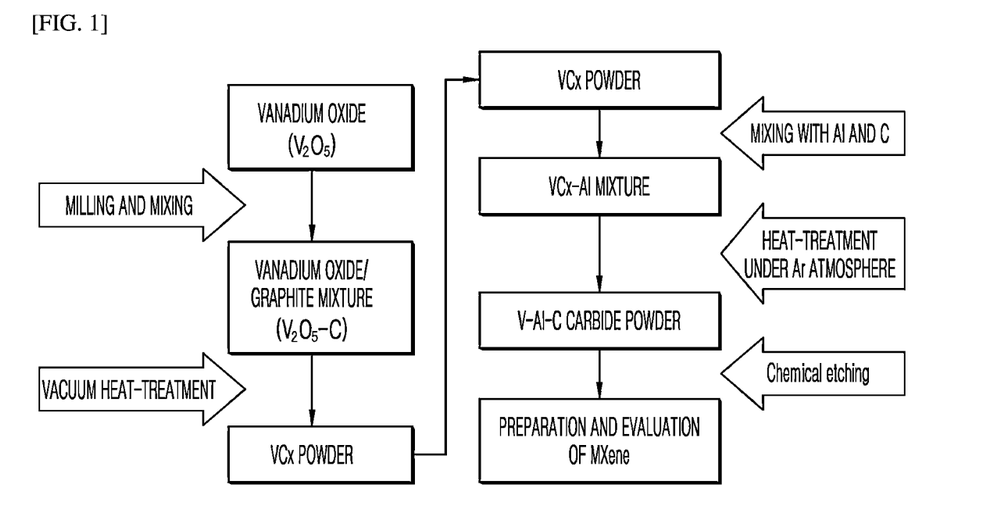
FIG. 1 shows a schematic diagram of the preparation process of Max and MXene using vanadium carbide according to an embodiment of the present disclosure.

FIG. 1 shows a schematic diagram of the preparation process of Max and MXene using vanadium carbide according to an embodiment of the present disclosure.

Referring to FIG. 1, for example, vanadium pentoxide ($V_2O_5$) as an vanadium oxide is mixed with graphite, the mixture is subjected to milling in a high-energy milling device to prepare a vanadium oxide/graphite mixture ($V_2O_5$—C), and the mixture is subjected to vacuum heat-treatment to prepare vanadium carbide ($VC_x$) powder.

Then, aluminum is added to the vanadium carbide ($VC_x$) powder to prepare a vanadium carbide-aluminum ($VC_x$—Al) mixture.

Thereafter, the vanadium carbide-aluminum ($VC_x$—Al) mixture is subjected to heat-treatment under an argon atmosphere to prepare vanadium-aluminum-carbon carbide (V—Al—C) powder.

Then, the vanadium-aluminum-carbon carbide (V—Al—C) powder is subjected to chemical etching to prepare MXene, and its physical properties are evaluated.

Method for Preparing Max Using Vanadium Carbide

The present disclosure provides a method for preparing Max using low-cost vanadium carbide instead of an expensive vanadium metal.

The method for preparing Max using vanadium carbide comprises (a-1) mixing vanadium oxide and a carbon compound to form a mixed powder and refining the particle size through high-energy milling using a high-energy milling device, followed by carbonation-reduction reaction by vacuum heat-treatment, to prepare vanadium carbide; and (a-2) adding aluminum to the vanadium carbide, followed by heat-treatment under an inert gas, to prepare Max using vanadium carbide.

In addition, the present disclosure provides a method for preparing Max using low-cost vanadium carbide instead of an expensive vanadium metal, which has excellent process stability and is economical as it enables mass production.

In addition, in the step of (a-1) mixing vanadium oxide and a carbon compound to form a mixed powder and refining the particle size through high-energy milling using a high-energy milling device, followed by carbonation-reduction reaction by vacuum heat-treatment, to prepare vanadium carbide, the mixing ratio of the vanadium oxide and the carbon compound may be 1:0.3 to 1:0.5 in weight ratio.

Here, when the mixing ratio of the vanadium oxide and the carbon compound is within the above-described range in weight ratio, oxycarbide in the form of $V(C_xO_{1-x})$ with a large amount of oxygen may not be easily formed.

At this time, the mixing ratio of the vanadium oxide and the carbon compound may preferably be 1:0.35 to 1:0.45 in weight ratio, and more preferably 1:0.35 to 1:0.4 in weight ratio.

Here, the high-energy milling may be performed by mixing the vanadium oxide and the carbon compound, putting the mixed powder together with a steel ball into a rotating container in a high-energy milling device, subjecting the mixture to a carbonation-reduction reaction in an atmosphere of air, vacuum, nitrogen, or argon, and refining the vanadium oxide and carbon compound through high-energy milling to increase the contact area and carbonation-reduction reaction rate.

In addition, in the step of (a-1) mixing vanadium oxide and a carbon compound to form a mixed powder and refining the particle size through high-energy milling using a high-energy milling device, followed by carbonation-reduction reaction by vacuum heat-treatment, to prepare vanadium carbide, the steel ball of the high-energy milling device may be at least one selected from ceramic balls, metal balls, and cemented carbide balls.

Specifically, the material of the steel ball may be steel, tungsten, or zirconia.

Here, the shape of the steel ball may be at least one selected from a spherical shape, a star shape, a horn shape, and a column shape.

In addition, in the step of (a-1) mixing vanadium oxide and a carbon compound to form a mixed powder and refining the particle size through high-energy milling using a high-energy milling device, followed by carbonation-reduction reaction by vacuum heat-treatment, to prepare vanadium carbide, the rotating shaft of the high-energy milling device may rotate at 150 to 250 rpm, and the rotating container may rotate at 300 to 500 rpm in a direction opposite to the rotation direction of the rotating shaft, to perform high-energy milling for 1 to 20 hours.

Here, the high-energy milling may be performed by rotating the rotating shaft and the rotating container in opposite directions to rub and mill the steel ball and the mixed powder of the vanadium oxide and the carbon compound introduced into the rotating container, and pulverizing the particles of the mixed powder of the vanadium oxide and the carbon compound to reduce the average particle size of the mixed powder to 2 nm to 50 μm.

Accordingly, the particle size of the mixed powder of the vanadium oxide and the carbon compound may be 2 nm to 50 μm.

In addition, the high-energy milling device may be a planetary ball mill, spex mill, or attritor.

Here, the planetary ball mill may charge a steel ball together with a raw material into a container and rotate and revolve the container at a high speed, thereby reducing the particle size of the mixed powder of the vanadium oxide and the carbon compound to the above-described range.

In addition, the spex mill may charge a steel ball together with a raw material into a container and vibrate the container up and down and left and right at a high speed, thereby reducing the particle size of the mixed powder of the vanadium oxide and the carbon compound to the above-described range.

In addition, the attritor may charge a steel ball together with a raw material into a container and transfer energy by the rotational force of the rotor, thereby reducing the particle size of the mixed powder of the vanadium oxide and the carbon compound to the above-described range.

In addition, the high-energy milling device may rotate the rotating container containing the mixed powder of the vanadium oxide and the carbon compound and the rotating shaft of the rotating plate in opposite directions on the rotating plate, thereby reducing the particle size of the mixed powder of the vanadium oxide and the carbon compound to the above-described range.

In addition, in the step of (a-1) mixing vanadium oxide and a carbon compound to form a mixed powder and refining the particle size through high-energy milling using a high-energy milling device, followed by carbonation-reduction reaction by vacuum heat-treatment, to prepare vanadium carbide, the heat-treatment temperature of the vacuum heat-treatment may be 1200° C. to 1600° C., and the heat-treatment time may be 1 hour to 5 hours.

Here, when the heat-treatment temperature of the vacuum heat-treatment is within the above-described range, the vanadium carbide may have excellent low-oxygen properties and manufacturing efficiency.

That is, the mixed powder of the vanadium oxide and the carbon compound prepared by the high-energy milling device may be subjected to vacuum heat-treatment at the heat-treatment temperature of the vacuum heat-treatment to prepare vanadium carbide with excellent low-oxygen properties and manufacturing efficiency.

At this time, the heat-treatment temperature of the vacuum heat-treatment may preferably be 1300° C. to 1550° C., and more preferably 1400° C. to 1500° C.

In addition, when the heat-treatment time of the vacuum heat-treatment is within the above-described range, the vanadium carbide may have excellent low-oxygen properties and manufacturing efficiency.

That is, the mixed powder of the vanadium oxide and the carbon compound prepared by the high-energy milling device may be subjected to vacuum heat-treatment during the heat-treatment time of the vacuum heat-treatment to prepare vanadium carbide with excellent low-oxygen properties and manufacturing efficiency.

At this time, the heat-treatment time of the vacuum heat-treatment may preferably be 2 hours to 4 hours, and more preferably 2 hours to 3 hours.

In addition, the carbonation-reduction reaction may be performed by refining the vanadium oxide and carbon compound by high-energy milling to increase the contact area and carbonation reduction reaction rate.

In addition, in the step of (a-2) adding aluminum to the vanadium carbide, followed by heat-treatment under an inert gas, to prepare Max using vanadium carbide, the inert gas may be argon, nitrogen, or hydrogen.

In addition, the heat-treatment temperature of the vacuum heat-treatment may be 1200° C. to 1600° C., and the heat-treatment time may be 1 hour to 5 hours.

Here, when the heat-treatment temperature is within the above-described range, the vanadium carbide may have excellent low-oxygen properties and manufacturing efficiency.

That is, the mixed powder of the vanadium oxide and the carbon compound may be subjected to vacuum heat-treatment at the heat-treatment temperature to prepare vanadium carbide with excellent low-oxygen properties and manufacturing efficiency.

At this time, the heat-treatment temperature of the vacuum heat-treatment may be preferably 1300° C. to 1550° C., and more preferably 1400° C. to 1500° C.

In addition, when the heat-treatment time is within the above-described range, the vanadium carbide may have excellent low-oxygen properties and manufacturing efficiency.

That is, the mixed powder of the vanadium oxide and the carbon compound may be subjected to vacuum heat-treatment during the heat-treatment time to prepare vanadium carbide with excellent low-oxygen properties and manufacturing efficiency.

At this time, the heat-treatment time of the vacuum heat-treatment may preferably be 2 hours to 4 hours, and more preferably 2 hours to 3 hours.

Figure 2:
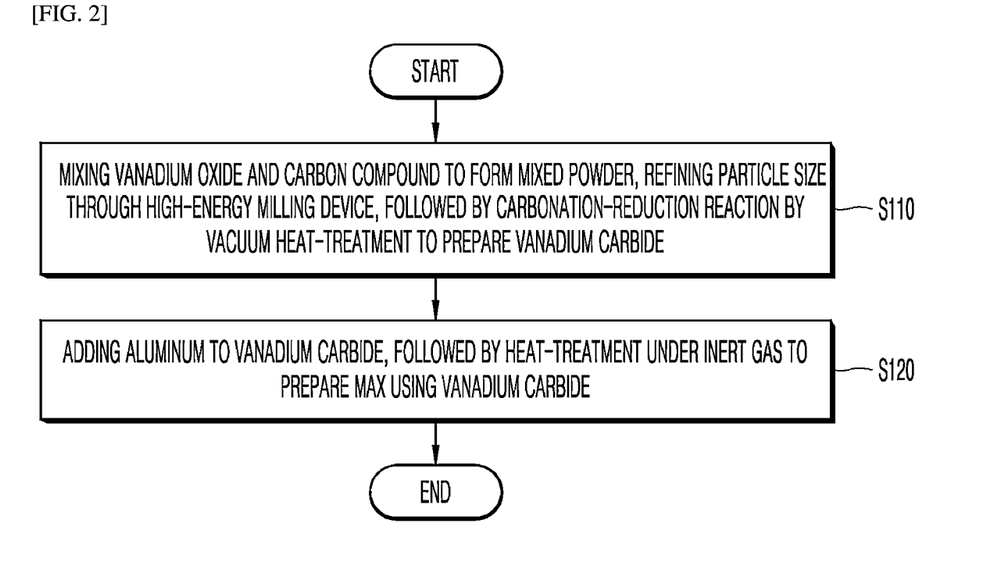
FIG. 2 shows a process flow diagram of a method for preparing Max using vanadium carbide according to an embodiment of the present disclosure.

FIG. 2 shows a process flow diagram of a method for preparing Max using vanadium carbide according to an embodiment of the present disclosure.

Referring to FIG. 2, vanadium oxide and a carbon compound are first mixed to form a mixed powder, the particle size is refined through high-energy milling using a high-energy milling device, and a carbonation-reduction reaction by vacuum heat-treatment is performed to prepare vanadium carbide. S110

Afterwards, aluminum is added to the vanadium carbide, and the mixture is subjected to heat-treatment under an inert gas to prepare Max using vanadium carbide. S120

Figure 3:
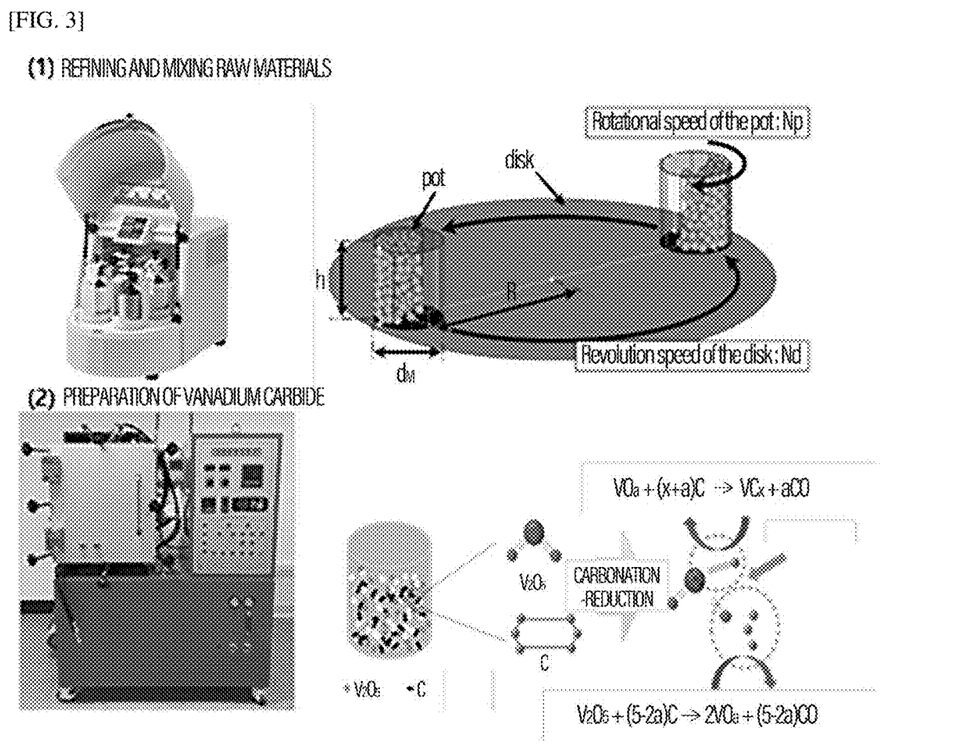
FIG. 3 shows schematic diagrams of (a) a high-energy milling device, (b) a rotating plate of the high-energy milling device, (c) a device for preparing vanadium carbide, and (d) a carbonation-reduction reaction according to an embodiment of the present disclosure.

FIG. 3 shows schematic diagrams of (a) a high-energy milling device, (b) a rotating plate of the high-energy milling device, (c) a device for preparing vanadium carbide, and (d) a carbonation-reduction reaction according to an embodiment of the present disclosure.

FIG. 3A shows a photograph of a high-energy milling device that performs refining and mixing of raw materials.

Referring to FIG. 3B, the main axis of the rotating plate of the high-energy milling device and the rotating container containing the mixed powder of the vanadium oxide and the carbon compound rotate in opposite directions, and the rotational forces in opposite directions may reduce the particle size of the mixed powder of the vanadium oxide and the carbon compound to 2 nm to 50 μm.

Referring to FIG. 3C, it is a photograph of a device for preparing vanadium carbide.

FIG. 3D is a schematic diagram of a carbonation-reduction reaction, and the reaction formula for vanadium carbide prepared through the carbonation-reduction reaction of vanadium oxide and a carbon compound is shown in the following Scheme 4:

$VOa+(x+a)C \rightarrow VC_x+aCO.$ [Scheme 4]

In addition, for example, when vanadium oxide ($V_2O_5$) is used as a raw material for the preparation of low-oxygen vanadium carbide, vanadium carbide is formed through the reaction of vanadium oxide with carbon, that is, carbonation-reduction, as shown in the following Scheme 5:

$V_2O_5+(5+2x)C \rightarrow 2VC_x+5CO.$ [Scheme 5]

MXene Using Vanadium Carbide

The present disclosure provides MXene using low-cost vanadium carbide instead of an expensive vanadium metal.

The present disclosure provides MXene using vanadium carbide, which is a two-dimensional nanomaterial formed by subjecting the Max using vanadium carbide to aluminum etching and interlayer peeling.

The present disclosure provides MXene using low-cost vanadium carbide instead of an expensive vanadium metal, which, as a two-dimensional nanomaterial, has excellent physical properties and can be used for a variety of purposes, e.g., in semiconductor materials, electronic materials, and catalysts.

Here, the MXene using vanadium carbide may be a two-dimensional nanomaterial formed by subjecting the Max using vanadium carbide to aluminum etching and interlayer peeling.

In addition, the MXene using vanadium carbide may be MXene using low-cost vanadium carbide instead of an expensive vanadium metal.

At this time, the vanadium metal is a material that easily forms carbides, nitrides, or oxides due to its high affinity with non-metallic components such as carbon, nitrogen, and oxygen.

The MXene using vanadium carbide of the present disclosure may be at least one selected from compounds represented by the following formulae 4 to 6:

$V_2C$ [Formula 4]

$V_4C_3$ [Formula 5]

$V_3C_2.$ [Formula 6]

In addition, the carbon content in the MXene using vanadium carbide may be 10.5 to 15 wt %.

Here, when the carbon content in the MXene using vanadium carbide is within the above-described range, the MXene using vanadium carbide may not be easily formed into MXene with a large amount of oxygen.

At this time, the carbon content in the MXene using vanadium carbide may preferably be 10.6 to 14.8 wt %, and more preferably 10.7 to 14.5 wt %.

In addition, the oxygen content in the MXene using vanadium carbide may be 1,000 to 5,000 ppm.

Here, when the oxygen content is within the above-described range, oxycarbide in the form of $V(C_xO_{1-x})$ with a large amount of oxygen may not be easily formed.

At this time, the oxygen content may preferably be 1,000 to 4,980 ppm, and more preferably 1,000 ppm to 4,950 ppm.

In addition, the vanadium carbide may be formed by mixing vanadium oxide and a carbon compound, and refining the particle size through high-energy milling using a high-energy milling device, followed by carbonation-reduction reaction by vacuum heat-treatment.

FIG. 1 shows a schematic diagram of the preparation process of Max and MXene using vanadium carbide according to an embodiment of the present disclosure.

Referring again to FIG. 1, for example, vanadium pentoxide ($V_2O_5$) as an vanadium oxide is mixed with graphite, the mixture is subjected to milling in a high-energy milling device to prepare a vanadium oxide/graphite mixture ($V_2O_5$—C), and the mixture is subjected to vacuum heat-treatment to prepare vanadium carbide ($VC_x$) powder.

Then, aluminum is added to the vanadium carbide ($VC_x$) powder to prepare a vanadium carbide-aluminum ($VC_x$—Al) mixture.

Thereafter, the vanadium carbide-aluminum ($VC_x$—Al) mixture is subjected to heat-treatment under an argon atmosphere to prepare vanadium-aluminum-carbon carbide (V—Al—C) powder.

Then, the vanadium-aluminum-carbon carbide (V—Al—C) powder is subjected to chemical etching to prepare MXene, and its physical properties are evaluated.

Method for Preparing MXene Using Vanadium Carbide

The present disclosure provides a method for preparing MXene using low-cost vanadium carbide instead of an expensive vanadium metal.

The method for preparing MXene using vanadium carbide comprises (b-1) mixing vanadium oxide and a carbon compound to form a mixed powder and refining the particle size through high-energy milling using a high-energy milling device, followed by carbonation-reduction reaction by vacuum heat-treatment, to prepare vanadium carbide; (b-2) adding aluminum to the vanadium carbide, followed by heat-treatment under an inert gas, to prepare Max using vanadium carbide; and (b-3) subjecting the Max using vanadium carbide to aluminum etching and interlayer peeling, to prepare MXene using vanadium carbide.

The present disclosure provides a method for preparing MXene using low-cost vanadium carbide instead of an expensive vanadium metal, which has excellent process stability and is economical as it enables mass production.

In addition, in the step of (b-1) mixing vanadium oxide and a carbon compound to form a mixed powder and refining the particle size through high-energy milling using a high-energy milling device, followed by carbonation-reduction reaction by vacuum heat-treatment, to prepare vanadium carbide, the mixing ratio of the vanadium oxide and the carbon compound may be 1:0.3 to 1:0.5 in weight ratio.

Here, when the mixing ratio of the vanadium oxide and the carbon compound is within the above-described range in weight ratio, oxycarbide in the form of $V(C_xO_{1-x})$ with a large amount of oxygen may not be easily formed.

At this time, the mixing ratio of the vanadium oxide and the carbon compound may preferably be 1:0.35 to 1:0.45 in weight ratio, and more preferably 1:0.35 to 1:0.4 in weight ratio.

In addition, in the step of (b-1) mixing vanadium oxide and a carbon compound to form a mixed powder and refining the particle size through high-energy milling using a high-energy milling device, followed by carbonation-reduction reaction by vacuum heat-treatment, to prepare vanadium carbide, the steel ball of the high-energy milling device may be at least one selected from ceramic balls, metal balls, and cemented carbide balls.

Specifically, the material of the steel ball may be steel, tungsten, or zirconia.

Here, the shape of the steel ball may be at least one selected from a spherical shape, a star shape, a horn shape, and a column shape.

In addition, in the step of (b-1) mixing vanadium oxide and a carbon compound to form a mixed powder and refining the particle size through high-energy milling using a high-energy milling device, followed by carbonation-reduction reaction by vacuum heat-treatment, to prepare vanadium carbide, the rotating shaft of the high-energy milling device may rotate at 150 to 250 rpm, and the rotating container may rotate at 300 to 500 rpm in a direction opposite to the rotation direction of the rotating shaft, to perform high-energy milling for 1 to 20 hours.

Here, the high-energy milling may be performed by rotating the rotating shaft and the rotating container in opposite directions to rub and mill the steel ball and the mixed powder of the vanadium oxide and the carbon compound introduced into the rotating container, and pulverizing the particles of the mixed powder of the vanadium oxide and the carbon compound to reduce the average particle size of the mixed powder to 2 nm to 50 μm.

Accordingly, the particle size of the mixed powder of the vanadium oxide and the carbon compound may be 2 nm to 50 μm.

In addition, the high-energy milling device may be a planetary ball mill, spex mill, or attritor.

Here, the planetary ball mill may charge a steel ball together with a raw material into a container and rotate and revolve the container at a high speed, thereby reducing the particle size of the mixed powder of the vanadium oxide and the carbon compound to the above-described range.

In addition, the spex mill may charge a steel ball together with a raw material into a container and vibrate the container up and down and left and right at a high speed, thereby reducing the particle size of the mixed powder of the vanadium oxide and the carbon compound to the above-described range.

In addition, the attritor may charge a steel ball together with a raw material into a container and transfer energy by the rotational force of the rotor, thereby reducing the particle size of the mixed powder of the vanadium oxide and the carbon compound to the above-described range.

In addition, the high-energy milling device may rotate the rotating container containing the mixed powder of the vanadium oxide and the carbon compound and the rotating shaft of the rotating plate in opposite directions on the rotating plate, thereby reducing the particle size of the mixed powder of the vanadium oxide and the carbon compound to the above-described range.

In addition, in the step of (b-1) mixing vanadium oxide and a carbon compound to form a mixed powder and refining the particle size through high-energy milling using a high-energy milling device, followed by carbonation-reduction reaction by vacuum heat-treatment, to prepare vanadium carbide, the heat-treatment temperature of the vacuum heat-treatment may be 1200° C. to 1600° C., and the heat-treatment time may be 1 hour to 5 hours.

Here, when the heat-treatment temperature of the vacuum heat-treatment is within the above-described range, the vanadium carbide may have excellent low-oxygen properties and manufacturing efficiency.

That is, the mixed powder of the vanadium oxide and the carbon compound prepared by the high-energy milling device may be subjected to vacuum heat-treatment at the heat-treatment temperature of the vacuum heat-treatment to prepare vanadium carbide with excellent low-oxygen properties and manufacturing efficiency.

At this time, the heat-treatment temperature of the vacuum heat-treatment may preferably be 1300° C. to 1550° C., and more preferably 1400° C. to 1500° C.

In addition, when the heat-treatment time of the vacuum heat-treatment is within the above-described range, the vanadium carbide may have excellent low-oxygen properties and manufacturing efficiency.

That is, the mixed powder of the vanadium oxide and the carbon compound prepared by the high-energy milling device may be subjected to vacuum heat-treatment during the heat-treatment time of the vacuum heat-treatment to prepare vanadium carbide with excellent low-oxygen properties and manufacturing efficiency.

At this time, the heat-treatment time of the vacuum heat-treatment may preferably be 2 hours to 4 hours, and more preferably 2 hours to 3 hours.

In addition, in the step of (b-2) adding aluminum to the vanadium carbide, followed by heat-treatment under an inert gas, to prepare Max using vanadium carbide, the heat-treatment temperature of the vacuum heat-treatment may be 1200° C. to 1600° C., and the heat-treatment time may be 1 hour to 5 hours.

Here, when the heat-treatment temperature is within the above-described range, the vanadium carbide may have excellent low-oxygen properties and manufacturing efficiency.

That is, the mixed powder of the vanadium oxide and the carbon compound may be subjected to vacuum heat-treatment at the heat-treatment temperature to prepare vanadium carbide with excellent low-oxygen properties and manufacturing efficiency.

At this time, the heat-treatment temperature of the vacuum heat-treatment may preferably be 1300° C. to 1550° C., and more preferably 1400° C. to 1500° C.

In addition, when the heat-treatment time is within the above-described range, the vanadium carbide may have excellent low-oxygen properties and manufacturing efficiency.

That is, the mixed powder of the vanadium oxide and the carbon compound may be subjected to vacuum heat-treatment during the heat-treatment time to prepare vanadium carbide with excellent low-oxygen properties and manufacturing efficiency.

At this time, the heat-treatment time of the vacuum heat-treatment may preferably be 2 hours to 4 hours, and more preferably 2 hours to 3 hours.

In addition, the carbonation-reduction reaction may be performed by refining the vanadium oxide and carbon compound by high-energy milling to increase the contact area and carbonation reduction reaction rate.

In addition, in the step of (b-3) subjecting the Max using vanadium carbide to aluminum etching and interlayer peeling, to prepare MXene using vanadium carbide, the aluminum etching may be performed using at least one selected from hydrofluoric acid (HF), lithium fluoride (LiF), sodium fluoride (NaF), magnesium fluoride ($MgF_2$), or a combination thereof, or a combination of these with at least one of hydrochloric acid, sulfuric acid and nitric acid.

In addition, the interlayer peeling may be performed using tetrabutylammonium hydroxide (TBAOH), tetrapropylammonium hydroxide (TPAOH), tetraethylammonium hydroxide (TEAOH), or tetramethylammonium hydroxide (TMAOH).

Figure 4:
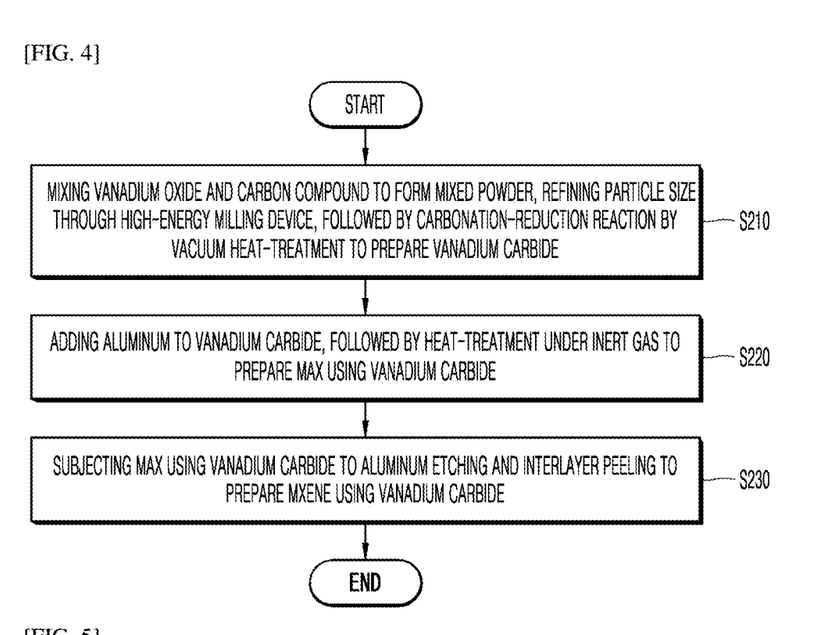
FIG. 4 shows a process flow diagram of a method for preparing MXene using vanadium carbide according to an embodiment of the present disclosure.

FIG. 4 shows a process flow diagram of a method for preparing MXene using vanadium carbide according to an embodiment of the present disclosure.

Referring to FIG. 4, vanadium oxide and a carbon compound are first mixed to form a mixed powder, the particle size is refined through high-energy milling using a high-energy milling device, and a carbonation-reduction reaction by vacuum heat-treatment is performed to prepare vanadium carbide. S210

Afterwards, aluminum is added to the vanadium carbide, and the mixture is subjected to heat-treatment under an inert gas to prepare Max using vanadium carbide. S220

Then, the Max using vanadium carbide is subjected to aluminum etching and interlayer peeling to prepare MXene using vanadium carbide. S230

Hereafter, preferred embodiments are proposed to help understand the present disclosure, but the following embodiments just exemplify the present disclosure and the scope of the present disclosure is not limited to the following embodiments. The following embodiments may be appropriately modified and changed by those skilled in the art within the scope of the present disclosure.

EMBODIMENT

<Examples 1 to 7> Preparation of Vanadium Carbide

Mixed powder of vanadium oxide and a carbon compound was prepared using the ingredients and contents shown in Table 1 below.

Afterwards, the mixed powder was added together with a steel ball into a rotating container in the high-energy milling device shown in Table 1 below.

Then, when pulverizing particles in the high-energy milling device shown in Table 1 below, the high energy shown in Table 1 below was input in an atmosphere of air, vacuum, nitrogen, or argon, which is a gaseous condition, the rotating shaft and rotating container were rotated in opposite directions, and high-energy milling was performed to prepare fine powder.

Thereafter, the fine powder was subjected to carbonation-reduction reaction by vacuum heat-treatment under the conditions shown in Table 1 below to prepare vanadium carbide.

<Comparative Example 1> Preparation of Vanadium Carbide

The vanadium carbide of the comparative example was prepared in the same manner as in Example 1, except that a high-energy milling device was used in Example 1.

TABLE 1

| | Example 1 | Example 2 | Example 3 | Example 4 | Example 5 | Example 6 | Example 7 | Comparative Example 1 |
|---|---|---|---|---|---|---|---|---|
| Vanadium oxide (A) | Vanadium pentoxide ($V_2O_5$) | Vanadium pentoxide ($V_2O_5$) | Vanadium pentoxide ($V_2O_5$) | Vanadium pentoxide ($V_2O_5$) | Vanadium pentoxide ($V_2O_5$) | Vanadium pentoxide ($V_2O_5$) | Vanadium pentoxide ($V_2O_5$) | Vanadium pentoxide ($V_2O_5$) |
| Carbon compound (B) | Graphite | Graphite | Graphite | Graphite | Graphite | Graphite | Graphite | Graphite |
| Molar ratio of B/A | 6.30 | 6.40 | 6.50 | 7.00 | 7.05 | 7.10 | 7.15 | 7.00 |
| Average particle size of mixed powder | 20 nm | 20 nm | 20 nm | 20 nm | 20 nm | 20 nm | 20 nm | 45 μm |
| High-energy milling device | Planetary ball mill | Planetary ball mill | Planetary ball mill | Planetary ball mill | Planetary ball mill | Planetary ball mill | Planetary ball mill | Horizontal ball mill |
| Energy (J/g · s) | 0.6 to 2.4 | 0.6 to 2.4 | 0.6 to 2.4 | 0.6 to 2.4 | 0.6 to 2.4 | 0.6 to 2.4 | 0.6 to 2.4 | 0.1 to 0.2 |
| Material of steel ball | Cemented carbide | Cemented carbide | Cemented carbide | Cemented carbide | Cemented carbide | Cemented carbide | Cemented carbide | Cemented carbide |
| Rotational rate of rotating shaft (rpm) | 250 | 250 | 250 | 250 | 250 | 250 | 250 | 150 |

TABLE 1-continued

| | Example 1 | Example 2 | Example 3 | Example 4 | Example 5 | Example 6 | Example 7 | Comparative Example 1 |
|---|---|---|---|---|---|---|---|---|
| Rotating rate of rotating container (rpm) | 500 | 500 | 500 | 500 | 500 | 500 | 500 | 150 |
| Gas conditions of pulverizing particles in the high-energy milling device | Air | Air | Air | Air | Air | Air | Air | Air |
| Vacuum heat-treatment temperature (° C.) | 1500 | 1500 | 1500 | 1500 | 1500 | 1500 | 1500 | 1500 |
| Vacuum heat-treatment time | 3 hours | 3 hours | 3 hours | 3 hours | 3 hours | 3 hours | 3 hours | 3 hours |
| Oxygen content in vanadium carbide (ppm) | 3680 | 2260 | 3670 | 3870 | 3370 | 1840 | 1440 | 12000 |
| Carbon content in vanadium carbide (wt %) | 10.9 | 12.8 | 13.1 | 15.8 | 15.9 | 16.8 | 17.5 | 19.0 |
| Formula of vanadium carbide ($VC_x$) | x = 0.52 | x = 0.62 | x = 0.64 | x = 0.80 | x = 0.81 | x = 0.86 | x = 0.90 | x = 0.80 |
| Average particle size of vanadium carbide | 20 nm | 20 nm | 20 nm | 20 nm | 20 nm | 20 nm | 20 nm | 10 μm |

Figure 5:
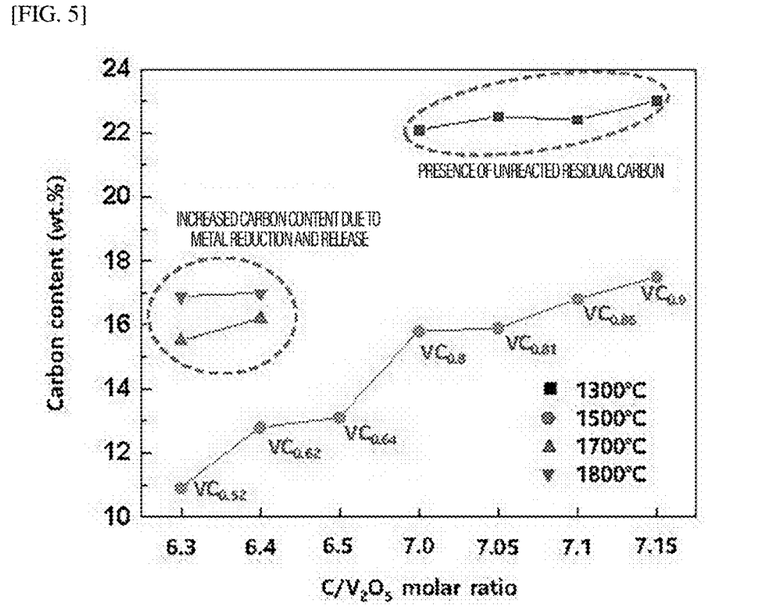
FIG. 5 shows a graph of the carbon content in vanadium carbide according to the amount of carbon input and heat-treatment temperature according to an embodiment of the present disclosure.

FIG. 5 shows a graph of the carbon content in vanadium carbide according to the amount of carbon input and heat-treatment temperature according to an embodiment of the present disclosure.

Figure 6:
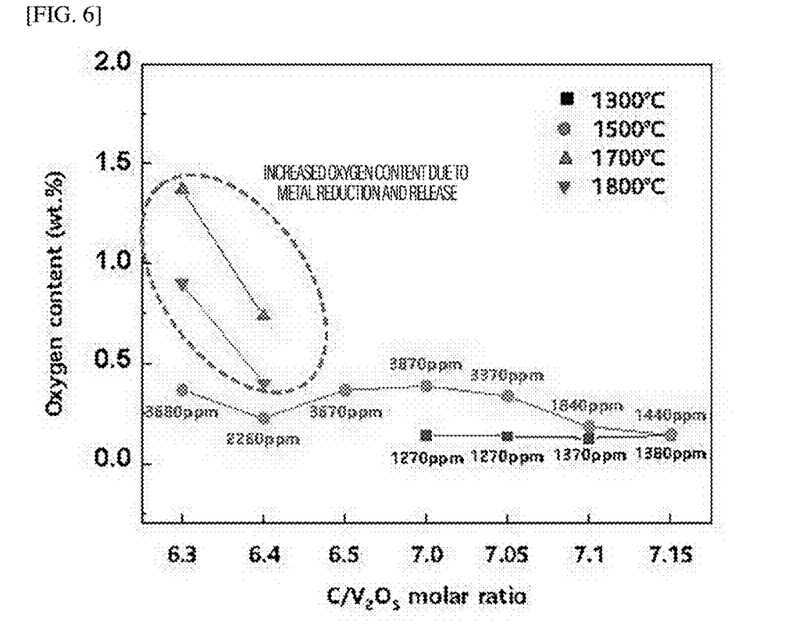
FIG. 6 shows a graph of the oxygen content in vanadium carbide according to the amount of carbon input and heat-treatment temperature according to an embodiment of the present disclosure.

FIG. 6 shows a graph of the oxygen content in vanadium carbide according to the amount of carbon input and heat-treatment temperature according to an embodiment of the present disclosure.

Referring to Table 1 above and FIG. 6, the oxygen content in the vanadium carbide of Examples 1 to 7 was 1440 ppm to 3870 ppm, which was significantly less than the oxygen content in the vanadium carbide of Comparative Example 1, i.e., 12,000 ppm.

Accordingly, the vanadium carbide of Examples 1 to 7 appeared to contain little oxygen.

In addition, the average particle size of the vanadium carbide of Examples 1 to 7 was 20 nm, which was a very small average particle size, as compared to the average particle size of the vanadium carbide of Comparative Example 1, i.e., 10 μm.

<Example 8> Preparation of Max Using Vanadium Carbide

Aluminum was added to the vanadium carbide prepared in Examples 1 and 3 to prepare a mixed powder.

Afterwards, the mixed powder was subjected to heat-treatment at 1500° C. for 3 hours under argon gas to prepare Max using vanadium carbide.

<Comparative Example 2> Preparation of Max

Max was prepared in the same manner as in Example 8, except for using the vanadium carbide of Comparative Example 1.

<Experimental Example> Analysis of XRD Patterns of Max Using Vanadium Carbide

Figure 7A:
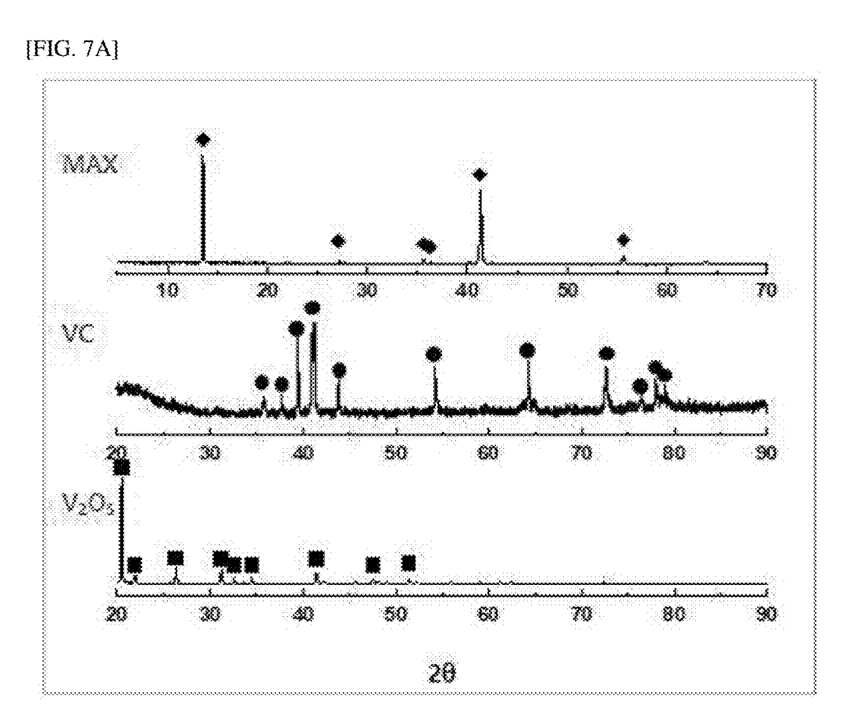
FIG. 7A shows XRD pattern of $V_2AlC$ Max and FIG. 7B shows XRD pattern of $V_{12}Al_3C_8$ Max, which are vanadium-based Max powders, according to an embodiment of the present disclosure.
Figure 7B:
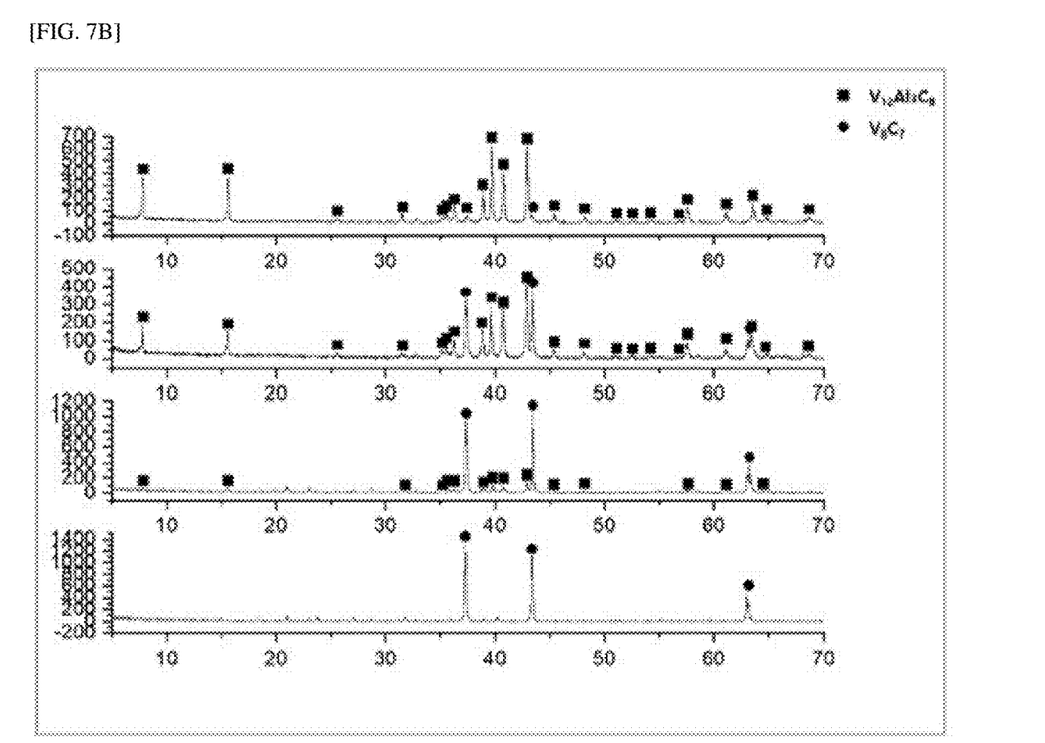

Graphs of the crystal structure (XRD) of the vanadium carbide prepared in Example 1 and Example 3 are shown in FIG. 7A and FIG. 7B.

FIG. 7A shows XRD pattern of $V_2AlC$ Max and FIG. 7B shows XRD pattern of $V_{12}Al_3C_8$ Max, which are vanadium-based Max powders, according to an embodiment of the present disclosure.

Referring to FIG. 7A, the XRD pattern of $V_2AlC$ Max of Example 1 did not show a vanadium metal pattern.

Referring to FIG. 7B, the XRD pattern of $V_{12}Al_3C_8$ Max of Example 3 did not show a vanadium metal pattern.

Therefore, it was confirmed that vanadium-based Max powder was successfully prepared by using (a) $V_2AlC$ Max and (b) $V_{12}Al_3C_8$ Max, which are the vanadium-based Max powder of Examples 1 and 3, comprising vanadium carbide with a controlled carbon content as a raw material, without using a vanadium metal.

Embodiments about Max and MXene using vanadium carbide and a method for preparing same according to the present disclosure were described above, but it is apparent that various modifications may be achieved without departing from the scope of the present disclosure.

Therefore, the scope of the present disclosure should not be limited to the embodiment(s) and should be determined by not only the following claims, but equivalents of the claims.

That is, it should be understood that the embodiments described above are not limitative, but only examples in all respects, the scope of the present disclosure is expressed by claims described below, not the detailed description, and it should be construed that all of changes and modifications achieved from the meanings and scope of claims and equivalent concept are included in the scope of the present disclosure.

What is claimed is:

1. Max using vanadium carbide,
wherein the Max consists of vanadium carbide of vanadium, aluminum, and carbon,
wherein the Max is used as a raw material for MXene, which is a two-dimensional nanomaterial,
wherein the Max is at least one selected from compounds represented by the following formulae 1 to 3, and
wherein the carbon content is 8 to 14 wt %:

$$V_2AlC \quad \text{[Formula 1]}$$

$$V_4AlC_3 \quad \text{[Formula 2]}$$

$$V_{12}Al_3C_8. \quad \text{[Formula 3]}$$

2. The Max using vanadium carbide according to claim 1, wherein the Max using vanadium carbide is formed by subjecting a mixture of vanadium carbide and aluminum to heat-treatment under an inert gas.

3. The Max using vanadium carbide according to claim 1, wherein the vanadium carbide is formed by refining vanadium oxide and a carbon compound, followed by mixing, to prepare a mixture of the vanadium oxide and the carbon compound, and subjecting the mixture to heat-treatment under vacuum and normal pressure.

4. The Max using vanadium carbide according to claim 1, wherein the vanadium carbide has a molar ratio of vanadium to carbon of 2:1, 3:2, or 4:3.

5. The Max using vanadium carbide according to claim 1, wherein the Max using vanadium carbide excludes the use of a vanadium metal.

6. The Max using vanadium carbide according to claim 1, wherein oxygen content in the Max using vanadium carbide is 1,000 to 5,000 ppm.

7. MXene using vanadium carbide,
wherein the MXene using vanadium carbide is a two-dimensional nanomaterial having a carbon content of 10.5 to 15 wt % formed by subjecting the Max using vanadium carbide of claim 1 to aluminum etching and interlayer peeling.

8. The MXene using vanadium carbide according to claim 7,
wherein the MXene using vanadium carbide is at least one selected from compounds represented by the following formulae 4 to 6:

$$V_2C \quad \text{[Formula 4]}$$

$$V_4C_3 \quad \text{[Formula 5]}$$

$$V_3C_2. \quad \text{[Formula 6]}$$

9. A method for preparing Max using vanadium carbide, comprising:
(a-1) mixing vanadium oxide and a carbon compound to form a mixed powder and refining the particle size through high-energy milling using a high-energy milling device, followed by carbonation-reduction reaction by vacuum heat-treatment, to prepare vanadium carbide; and
(a-2) adding aluminum to the vanadium carbide, followed by heat-treatment under an inert gas, to prepare Max using vanadium carbide of claim 1.

10. The method for preparing Max using vanadium carbide according to claim 9,
wherein the particle size of the mixed powder of the vanadium oxide and the carbon compound is 2 nm to 50 μm.

11. The method for preparing Max using vanadium carbide according to claim 9,
the high-energy milling is performed by
mixing the vanadium oxide and the carbon compound, adding the mixed powder together with a steel ball into a rotating container in a high-energy milling device,
subjecting the mixture to a carbonation-reduction reaction in an atmosphere of air, vacuum, nitrogen, or argon, and
refining the vanadium oxide and carbon compound through high-energy milling, to increase the contact area and carbonation-reduction reaction rate.

12. A method for preparing MXene using vanadium carbide, comprising:
(b-1) mixing vanadium oxide and a carbon compound to form a mixed powder and refining the particle size through high-energy milling using a high-energy milling device, followed by carbonation-reduction reaction by vacuum heat-treatment, to prepare vanadium carbide;
(b-2) adding aluminum to the vanadium carbide, followed by heat-treatment under an inert gas, to prepare Max using vanadium carbide; and
(b-3) subjecting the Max using vanadium carbide to aluminum etching and interlayer peeling, to prepare MXene using vanadium carbide of claim 7.

13. The method for preparing MXene using vanadium carbide according to claim 12,
wherein, in the step of (b-3) subjecting the Max using vanadium carbide to aluminum etching and interlayer peeling, to prepare MXene using vanadium carbide, the aluminum etching is performed using at least one selected from hydrofluoric acid (HF), lithium fluoride (LiF), sodium fluoride (NaF), magnesium fluoride ($MgF_2$), or a combination thereof, or a combination of these with at least one of hydrochloric acid, sulfuric acid and nitric acid.

* * * * *